US012792261B2

(12) United States Patent
Rekstad, Jr. et al.

(10) Patent No.: US 12,792,261 B2
(45) Date of Patent: Nov. 10, 2026

(54) METHODS AND SYSTEMS FOR STORING CONTENT

(71) Applicant: Comcast Cable Communications, LLC, Philadelphia, PA (US)

(72) Inventors: Gary Michael Rekstad, Jr., Philadelphia, PA (US); Benny J. Pruden, Brownstown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 245 days.

(21) Appl. No.: 18/462,040

(22) Filed: Sep. 6, 2023

(65) Prior Publication Data

US 2025/0077114 A1 Mar. 6, 2025

(51) Int. Cl.
*G06F 3/06* (2006.01)
*H04N 21/4335* (2011.01)

(52) U.S. Cl.
CPC .......... *G06F 3/0656* (2013.01); *G06F 3/0605* (2013.01); *G06F 3/0616* (2013.01); *G06F 3/0631* (2013.01); *G06F 3/0683* (2013.01); *G06F 3/0685* (2013.01); *H04N 21/4335* (2013.01)

(58) Field of Classification Search
None
See application file for complete search history.

(56) References Cited

U.S. PATENT DOCUMENTS

| | | | | |
|---|---|---|---|---|
| 5,488,587 | A * | 1/1996 | Fukumoto | G11C 14/00 365/228 |
| 8,499,256 | B1 * | 7/2013 | Iten | H04N 21/47214 715/810 |
| 9,990,253 | B1 * | 6/2018 | Rajimwale | G06F 11/1435 |
| 10,165,331 | B2 * | 12/2018 | Lo | H04N 21/47202 |
| 11,573,908 | B1 * | 2/2023 | Peng | G06F 12/0238 |
| 2002/0174430 | A1 * | 11/2002 | Ellis | H04N 21/4753 386/230 |
| 2002/0174433 | A1 * | 11/2002 | Baumgartner | H04N 21/4147 725/141 |
| 2010/0174804 | A1 * | 7/2010 | Sonoyama | H04L 67/1095 709/224 |
| 2011/0099582 | A1 * | 4/2011 | Howcroft | H04N 7/162 386/296 |
| 2014/0149533 | A1 * | 5/2014 | Bergman | H04N 21/231 709/213 |
| 2014/0233923 | A1 * | 8/2014 | Bradley | H04N 21/485 386/298 |
| 2014/0270712 | A1 * | 9/2014 | Bennett | H04N 5/782 386/292 |
| 2014/0344507 | A1 * | 11/2014 | Piggin | G06F 12/0246 711/103 |
| 2015/0237384 | A1 * | 8/2015 | Ruffini | H04N 21/23106 725/92 |

(Continued)

*Primary Examiner* — An Son P Huynh
(74) *Attorney, Agent, or Firm* — BakerHostetler

(57) ABSTRACT

Methods and systems for storing content are disclosed. Storage of a first portion of a content item to a buffer in a non-volatile storage for output via at least one output device may be caused. A duration of user inactivity associated with the at least one output device may be determined. Based at least on the duration satisfying a threshold, storage of a second portion of the content item to a volatile storage may be caused.

20 Claims, 9 Drawing Sheets

(56) References Cited

U.S. PATENT DOCUMENTS

| | | | | |
|---|---|---|---|---|
| 2015/0244971 | A1* | 8/2015 | Wickenkamp | H04N 5/91 386/295 |
| 2015/0281635 | A1* | 10/2015 | Tang | H04N 21/4334 386/295 |
| 2016/0150472 | A1* | 5/2016 | Yoon | G06F 1/3293 455/574 |
| 2018/0063580 | A1* | 3/2018 | Wittke | G06F 16/71 |
| 2020/0037008 | A1* | 1/2020 | Hassler | H04N 21/4331 |
| 2021/0297718 | A1* | 9/2021 | Chundi | H04N 21/4758 |
| 2022/0021914 | A1* | 1/2022 | Lintz | H04L 67/568 |
| 2022/0174345 | A1* | 6/2022 | Garcia | H04N 21/6582 |

* cited by examiner

METHODS AND SYSTEMS FOR STORING CONTENT

BACKGROUND

Content, such as video or audio content, may be provided by multiple sources. Recipients of data may be able to control the output (e.g., playback) of content using devices such as memory buffers for playing content, time shifting (e.g., trick play) features such as pause, rewind, and fast-forward. In addition, digital video recorder (DVR) devices may be configured to receive and store data such as content and to control the play back of the stored content using time shifting features. A draw back to continuously using storage devices, such as buffers, comes with wearability and damage to components due to continuous and cycled use. This disclosure addresses these and other shortcomings.

SUMMARY

Systems and methods for storing content are described herein. A first portion of content may be stored (e.g., cached) in a first storage, such as in a non-volatile storage medium. A viewer of the content may leverage the stored first portion to control (e.g., time shift) the output of the content via an output device. However, the first storage may wear out over time due to the impact of numerous read/write/erase cycles. To reduce the number of read/write/erase cycles on the first storage, storage of the first portion of the content to the first storage may be terminated. If storage of the first portion of the content to the first storage is terminated, a second portion of the content may be stored (e.g., cached) in a second storage, such as in a volatile storage medium. The second storage may not wear out from repeated read/write/erase cycles. The viewer of the content may leverage the stored second portion to control (e.g., time shift) the output of the content via an output device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Time-shift buffers (TSBs) may be used to temporarily store incoming content (e.g., live linear video and/or audio content) so that viewers are able to pause the content and/or rewind the content. The TSB may be recorded on non-volatile memory, such as on hard disc drives (HDDs) or flash memory (e.g., NAND, eMMC, etc.). However, non-volatile memory can wear over time due to the impact of read/write/erase cycles on the media. For example, flash memory may only be able to withstand 10,000 or more write/erase cycles. To reduce the number of read/write/erase cycles (and therefore to reduce the wear on the non-volatile memory), an output device (e.g., a set-top box, television etc.) may stop writing to the TSB after a certain amount of time has expired (e.g., a timeout period of eight hours). While this may help to reduce the wear on the non-volatile memory, the non-volatile memory still has a limited life. Further, a viewer may be unable to pause and/or rewind the content after the output device stops writing to the TSB. Thus, improved techniques for storing content in a TSB while preserving non-volatile memory hardware are desirable.

Described herein are techniques for storing content in a TSB while preserving non-volatile memory are desirable. Instead of terminating recording of the TSB after a certain amount of time has expired, recording of the TSB may be switched from the non-volatile memory to any available volatile memory (e.g., random access memory (RAM) or dynamic RAM (DRAM)) if there has been no user activity (e.g., interaction) for the certain amount of time. The TSB may be recorded on the volatile memory until the output of the content is terminated or until user activity occurs. Switching recording of the TSB to volatile memory may reduce the wear on the non-volatile memory while still ensuring that the viewer is able to pause and/or rewind at least a portion of the content after the output device stops writing content to the TSB in the non-volatile memory.

Figure 1:
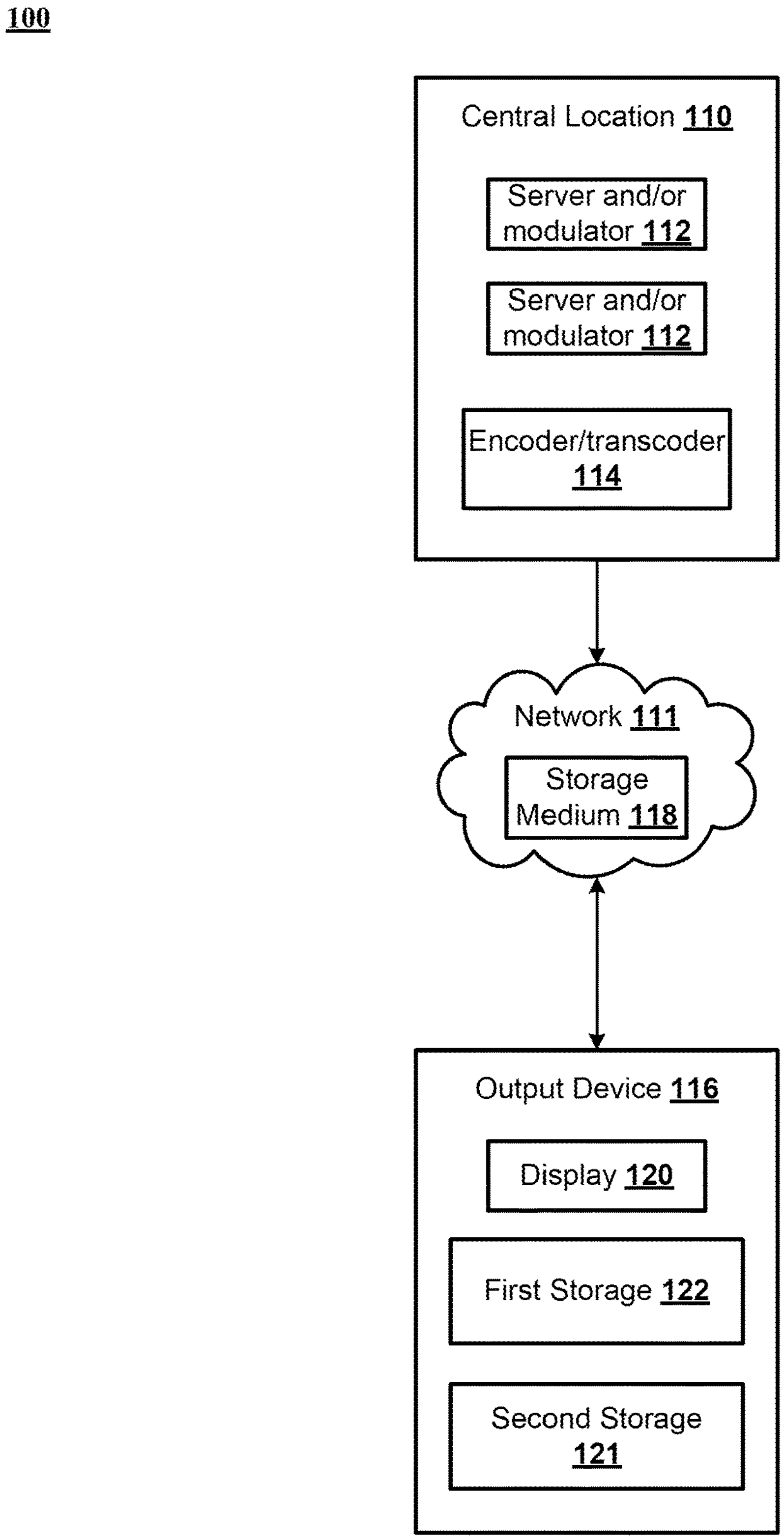
FIG. 1 is an example system.

FIG. 1 is an example system 100. The system 100 may be used to store content in a TSB while preserving non-volatile memory. The system 100 may comprise a central location 110 (e.g., a headend, or processing facility), which may receive content (e.g., data, input programming) from multiple sources. The central location 110 may combine the content from the various sources and may distribute the content to user locations (e.g., device location) via a distribution system and/or network, such as a network 111.

The central location 110 may be a data processing facility configured to receive content from a variety of sources. The content may be transmitted from the source to the central location 110 via a variety of transmission paths, including wireless and terrestrial paths. The central location 110 may comprise one or a plurality of streaming servers and/or signal modulators, such as quadrature amplitude modulation (QAM) devices, 112 that may be associated with an input source. The streaming servers and/or QAM devices 112 may transmit, or first convert and then transmit, received content into a modulated output signal suitable for transmission over the network 111. Encoders, such as an encoder 114, may be included for encoding/transcoding data such as content. The encoder 114 may comprise an MPEG encoder, an AV1 encoder, a VP9 encoder, and/or any other suitable type of encoder. A data packaging device, such as a fragmentor, may be integrated with the encoder 114 (or separate and in communication with the encoder 114) to package the encoded/transcoded content. The encoder 114 and/or fragmentor may repeatedly embed markers, flags, and signals into the content data stream for processing by downstream devices.

The network 111 may be configured to distribute signals from the central location 110 to user and/or device locations, such as a location of an output device 116. The network 111 may be an optical fiber network, a broadband network, a coaxial cable network, a hybrid fiber-coaxial network, a wireless network, a satellite system, a direct broadcast system, or any combination thereof. There may be a multitude of user locations connected to network 111.

The network 111 may comprise a storage medium 118. The storage medium 118 may be configured as network storage such as cloud storage accessible by one or more output devices 116. A number of content assets (e.g., video, audio, etc.) may be loaded into the storage medium 118 and stored for playback or processing by the one or more output devices 116. However, other data, content, and/or information may be stored in the storage medium 118 such as advertisements and alternative content, for example. The storage medium 118 may be separate from the network 111. For example, the storage medium 118 may be located upstream of the output devices 116 and downstream of the network 111. The storage medium 118 may store information to be transmitted to any number of the output devices 116 or other recipient devices. The output devices 116 may process a data stream, which may comprise audio, video, or other data from the network 111 with a regular cadence (e.g., every two seconds, four seconds, ten seconds, and the like). Other data and tracks may be received and processed by the user devices.

The output device 116 may be configured as a decoder, such as a gateway, set-top box, or communications terminal (CT) to decode, if needed, the signals for display on a display device, such as on a display 120. The output device 116 may receive signals from the network 111 for rendering content via the output device 116. The output device 116 may be a CT, a set-top box, a television, a computer, a smartphone, a laptop, a tablet, a multimedia playback device, a portable electronic device, and/or the like configured to cause output (e.g., playback) of content. The output device 116 may be an Internet Protocol compatible device for receiving signals via a network such as the Internet or some other communications network for providing content to the user. It is understood that other display devices and networks may be used. The output device 116 may be a widget or a virtual device for displaying content in a picture-in-picture environment such as via the display 120, for example.

The output device 116 may comprise a first storage 122. The first storage 122 may comprise, for example, a non-volatile storage medium. The non-volatile storage medium may comprise one or more hard disc drives (HDDs) or flash memory (NAND, eMMC, etc.). Content (e.g., video, audio, etc.) may be written to the first storage 122 and stored for playback or processing (e.g., trick play) by the output device 116. However, other data, content, and/or information may be stored in the first storage 122 such as firmware and/or settings data associated with the output device 116, for example. The first storage 122 may be separate from the output device 116 and in communication with the output device 116 such as via a portable flash drive.

The output device 116 may comprise a second storage 121. The second storage 121 may, for example, comprise a volatile storage medium. The volatile storage medium may comprise random access memory (RAM) or dynamic RAM (DRAM). A copy of the operating system (OS) may be loaded onto the second storage 121. One or more applications associated with the output device 116 may be loaded onto the second storage 121. The second storage 121 may facilitate local storage of at least a portion (e.g., two seconds or less) of received content for rendering of the content. For example, incoming content may be sent to the second storage 121 to buffer the incoming content to account for network variations and to avoid video freezes. Rendering content may comprise providing audio and/or video, displaying images, facilitating an audio or visual feedback, tactile feedback, and the like.

The first storage 122 may be used to provide a buffer, such as a time shift buffer (TSB), for caching a first portion (e.g., a playback duration) of a content item (e.g., live content stream, linear content stream) received from the network 111. The first portion of the content item may be cached in the first storage 122 if the output device 116 is activated (e.g., turned on, powered on) and/or if a user associated with the output device 116 switches to a new channel. The first portion of the content item may comprise any playback duration of the content item, such as 30 minutes, one hour, two hours, four hours, eight hours, etc. of the content item. The cached first portion may be leveraged to provide trick play features during playback.

However, the first storage 122 may wear out after several read/write/erase cycles. To reduce the number of read/write/erase cycles (and therefore to reduce the wear on the first storage 122), the output device 116 may stop writing content to the buffer (e.g., the TSB) in the first storage 122 based on determining that one or more condition(s) are satisfied. The one or more condition(s) may be satisfied if it is determined that an opportunity to reduce wear on the first storage 122 exists. The one or more condition(s) may be satisfied if one or more network conditions are met. The network condition(s) may be met as network conditions improve or deteriorate, if a loss of connectivity to a network is detected, if high packet loss (e.g., due to interference) is detected, and/or if any other network condition is met. The condition(s) for terminating storage of content to the first storage 122 may be satisfied if one or more device conditions are met. The device condition(s) may comprise any condition associated with the output device and/or a remote-control device associated with the output device. For example, the condition(s) for terminating storage of content to the first storage 122 may be satisfied if a threshold number of read/write/erase cycles on the first storage have occurred. The one or more condition(s) may be satisfied if output of the content item has terminated (e.g., the television show or movie has ended).

The one or more condition(s) may be satisfied if a user associated with the output device 116 has not interacted with the output device 116 for a predetermined duration. For example, the output device 116 may determine a duration of user inactivity associated with the output device 116. The output device 116 may stop (e.g., terminate) writing content to the buffer (e.g., the TSB) in the first storage 122 based on determining that the duration of user inactivity satisfies (e.g., exceeds) a threshold. The threshold may comprise any amount of time, including but not limited to 30 minutes, one hour, two hours, four hours, eight hours, etc.

Determining the duration of the user inactivity associated with the output device 116 may comprise determining an amount of time that has elapsed since a user associated with the output device 116 has interacted with the output device 116. A user may interact with the output device 116 in a variety of different ways. A user may press/select a button that is included on the output device 116 and/or a button that is included on a remote-control device associated with the output device 116. A user may send a command, such as a voice command, to the output device 116 and/or to a remote-control device associated with the output device 116. The voice command may instruct the output device 116 to output certain content, adjust a volume associated with content output, or perform household tasks (e.g., lower your smart blinds, dim smart lights, change the color of your bulbs, etc.) The command may be sent to the output device 116, for example, via an application installed on a mobile phone or tablet.

Based on the duration of user inactivity associated with the output device 116 satisfying the threshold, the output device 116 may cause output of a message via the display 120. The message may ask whether anybody is viewing the content (e.g., "are you still watching?"). The message may prompt a user associated with the output device 116 to respond to the message, such as via remote control button press and/or via voice command. If a user responds to the message, the output device 116 may continue writing the content to the buffer (e.g., TSB) in the first storage 122. The output device 116 may later cause a second output of the message if it is again determined that the duration of user inactivity associated with the output device 116 satisfies the threshold. Conversely, if a user does not respond to the message, the output device 116 may stop (e.g., terminate) writing the content to the buffer (e.g., TSB) in the first storage 122.

If the output device 116 stops writing the content to the buffer (e.g., TSB) in the first storage 122, the first portion of the content item may remain cached in the buffer in the first storage 122. Based on the output device 116 stopping writing the content to the buffer (e.g., TSB) in the first storage 122, the output device 116 may begin writing content to the second storage 121. To write the content to the second storage 121, the output device 116 may cause a second portion of the content item to be stored to the second storage 121. As described above, the second storage 121 may facilitate local storage of at least a portion (e.g., two seconds or less) of received content for rendering of the content. For example, incoming content may be sent to the second storage 121 to buffer the incoming content to account for network variations and to avoid video freezes. The second portion of the content item may be stored in a different (e.g., additional) section of the second storage 121 than the incoming content buffer is stored in.

As described above, switching recording of the TSB to the second storage 121 may reduce the wear on the first memory 122 while still ensuring that the viewer is able to pause and/or rewind at least a portion of the content after the output device stops writing the TSB to the first memory 122. Further, switching recording of the TSB to the second storage 121 may facilitate use of a shorter timeout period (e.g., six hours instead of eight hours). For example, the duration of user inactivity associated with the output device 116 may satisfy the threshold if a user associated with the output device 116 has not interacted with the output device 116 for six hours. Further, switching recording of the content to the second storage 121 from the buffer (e.g., TSB) in the first storage may facilitate use of a less durable (e.g., cheaper) first storage 122 by reducing the number of read/write/erase cycles.

The output device 116 may determine if the second storage 121 comprises a sufficient amount of memory available to store the second portion of the content item. If the output device 116 determines that the second storage 121 comprises a sufficient amount of memory available to store the second portion of the content item, the output device 116 may begin writing the second portion of the content item to the second storage 121. Conversely, if the output device 116 determines that the second storage 121 does not comprise a sufficient amount of memory available to store the second portion of the content item, the output device 116 may cause the sufficient amount of memory to become available in the second storage 121. The output device 116 may cause the sufficient amount of memory to become available in the second storage 121 by unloading at least one application from the second storage 121. The at least one application may comprise one or more applications that are inactive (e.g., loaded to the second storage 121 but are not currently in use). Based on causing the sufficient amount of memory to become available in the second storage 121, the output device 116 may begin writing the second portion of the content item to the second storage 121.

The output device 116 may continue writing the second portion of the content item to the second storage 121 until one or more conditions are satisfied. The condition(s) may be satisfied if the output device 116 is turned off and/or if user activity (e.g., interaction) is detected. If the condition(s) are satisfied while the output device 116 is writing the TSB to the second storage 121, the output device 116 may stop (e.g., terminate) writing the TSB to the second storage 121. Based on stopping writing the TSB to the second storage 121, the output device 116 may re-initiate (e.g., switch back to) writing the TSB to the first storage 122. Re-initiating writing content to the buffer (e.g., TSB) in the first storage 122 may comprise causing storage of a third portion of the content item in the first storage 122. The third portion of the content item may be stored along with the first portion of the content item in the first storage 122. Alternatively, the output device 116 may write over the first portion of the content item in the buffer (e.g., TSB) to store the third portion of the content item in the buffer (e.g., TSB) in the first storage 122.

Based on stopping writing the second portion of the content to the second storage 121, the output device 116 may cause the second portion of the content item to be stored in the first storage 122. By causing the second portion of the content item to be stored in the first storage 122, all portions of the content item may be stored in one central location (e.g., in the buffer in the first storage 122). Further, causing the second portion of the content item to be stored in the first storage 122 may provide redundancy for the period of transition between the second storage 121 and the first storage 122.

The output device 116 may cause execution of at least one trickplay operation using at least one of the first portion of the content item stored to the first storage 122 and/or the second portion of the content item stored to the second storage 121. The at least one trickplay operation may comprise a rewinding and/or a pausing operation. Causing execution of at least one trickplay operation using the first portion of the content item may comprise causing the content item to be rewound to an output time occurring during the first portion of the content item. Causing execution of at least one trickplay operation using the first portion of the content item may comprise causing the content item to be paused at an output time occurring during the first portion of the content item. Causing execution of at least one trickplay operation using the second portion of the content item may comprise causing the content item to be rewound to an output time occurring during the second portion of the content item. Causing execution of at least one trickplay operation using the second portion of the content item may comprise causing the content item to be paused at an output time occurring during the second portion of the content item.

Causing execution of at least one trickplay operation using the first portion of the content item and the second portion of the content item may comprise causing the content item to be rewound to an output time occurring during the first portion of the content item. Output of the content item may be caused by initiating output of the first portion of the content item starting at the output time occurring during the first portion of the content item. As output of the content item continues, output of the first portion of the content item may be terminated and output of the second portion of the content item may be initiated. As output of the content item further continues, output of the second portion of the content item may be terminated and output of a third portion of the content item stored in the first storage 122 may be initiated. Thus, the second storage 121 may function as an expansion of the first storage 122 such that the first storage 122 and the second storage 121, in combination, may be used to cause execution of at least one trickplay operation.

The amount of available memory in the second storage 121 may be large enough to hold only a limited playback duration (e.g., 15 seconds, thirty seconds, etc.) of the content item. To write content to the second storage 121, the output device 116 may repeatedly write over the second portion of the content item stored in the second storage 121 to generate a new second portion of the content item. Thus, the second portion of the content item stored in the second storage 121 may not be as large as the first portion of the content item stored in the first storage 122. The second portion of the content item stored in the second storage 121 may not be large enough to facilitate a user rewinding all the way back to the beginning of a show, but the second portion of the content item may still be large enough to facilitate quick rewinds (e.g., to rewatch a play in a sporting event or to try to catch missed dialog).

Switching storage of the content from the buffer (e.g., TSB) in the first storage 122 to the second storage 121 may reduce the wear on the first storage 122 while still ensuring that the viewer is able to execute a trickplay operation, such as by pausing or rewinding, on at least the second portion of the content after the output device stops writing content to the buffer (e.g., TSB) in the first storage 122.

Figure 2:
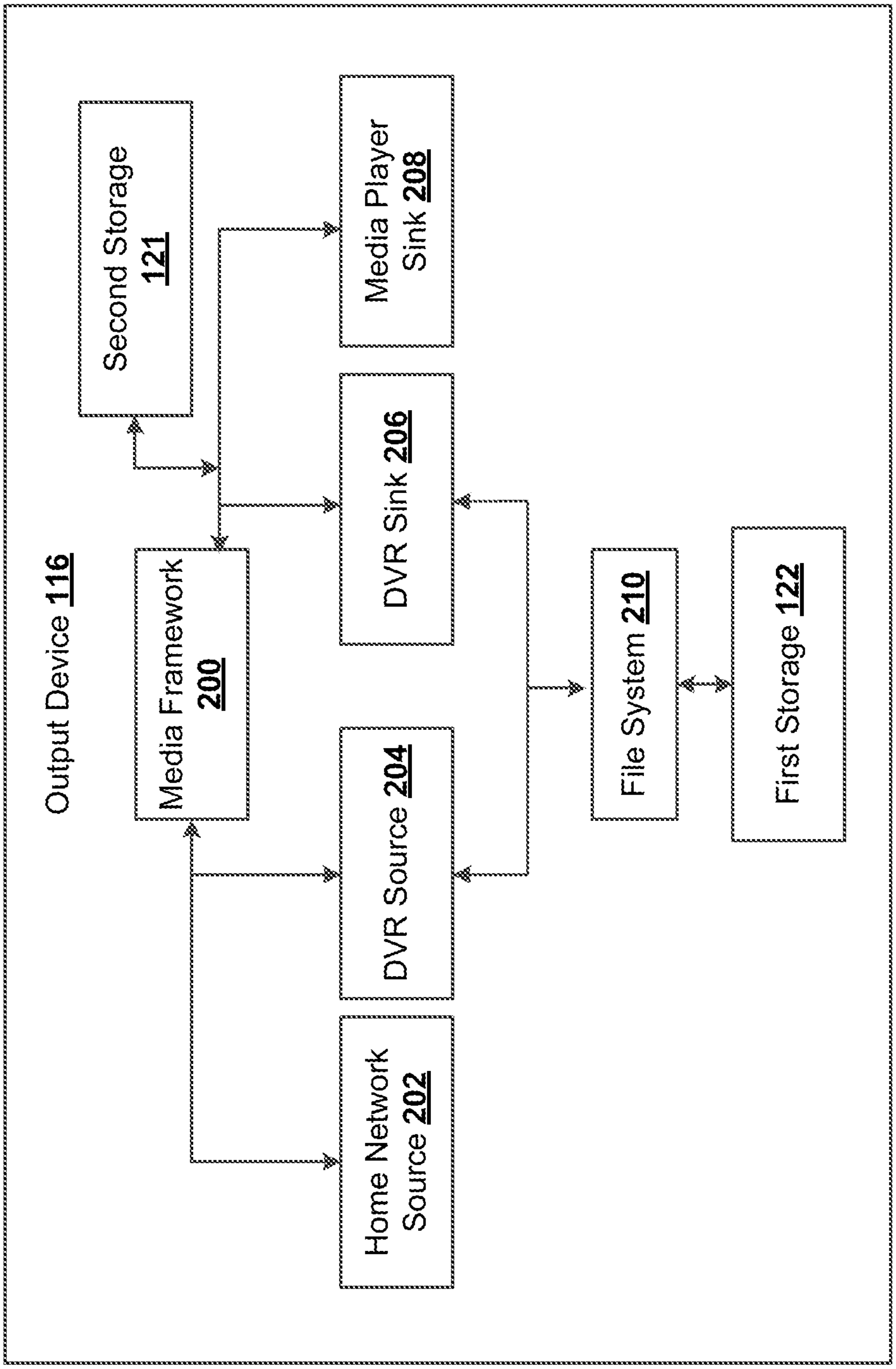
FIG. 2 is an example output device.

FIG. 2 is example output device 116. As shown, the output device 116 may comprise a media framework 200 for managing one or more media components (e.g., plug-ins) configured to control, for example, simple audio playback, audio and video playback, recording, streaming and editing. The media framework 200 may comprise hardware and/or software for managing the media components and service flows to/from the media components. The media components may comprise a media source 202, a DVR source 204, a DVR storage (e.g., sink) 206, a media sink 208, and/or the second storage 121.

The media source 202 (e.g., home network source) may be or comprise software for receiving data, processing data, and outputting a content stream (e.g., single program transport stream (SPTS)). The media source 202 may be configured to decrypt content using any suitable encryption format for IP traffic, such as using digital transmission content protection (DTCP). The media source 202 may be configured to communicate decrypted content to devices (e.g., the output device 116) on a user network or elsewhere. The DVR source 204 may comprise software for receiving data, processing data, and outputting a content stream (e.g., single program transport stream). As an example, the DVR source 204 may be configured to manage the play back of stored content. As another example, the DVR source 204 may be configured to read content from storage and to output a content stream (e.g., MPEG SPTS) to recipient devices (e.g., the output device 116). The DVR storage 206 may comprise software for managing the storing and indexing of data such as at least a portion of a content stream. The DVR storage 206 may be configured to store data to affect a time shift buffer and to enable trick play features. The DVR storage 206 may be configured to store data as a persistent recording for subsequent retrieval and playback. The media sink 208 may comprise software for managing the playback of data such as a live or recorded content stream. The media sink 208 may be configured to start/stop play back of content. The media sink 208 may be configured to manage trick play features of the play back content.

The output device 116 may comprise a file system 210, such as a flash file system for interfacing with the first storage 122. The file system 210 may be configured to manage the storage and retrieval of data to/from the first storage 122. The file system 210 may comprise drivers to facilitate the management of various types and configurations of the first storage 122. The file system 210 may manage the storage/retrieval of data to/from the first storage 122 to provide a time shift buffer for caching a first portion (e.g., a play back duration) of a current transport stream. The first cached portion may be leveraged to provide trick play features during playback.

The media framework 200 may manage the storage and retrieval of data to/from the second storage 121. The media framework 200 may manage the storage/retrieval of data to/from the second storage 121 to provide a time shift buffer for caching a second portion (e.g., a second playback duration) of a current transport stream. The second cached portion may be leveraged to provide trick play features during playback.

Figure 3:
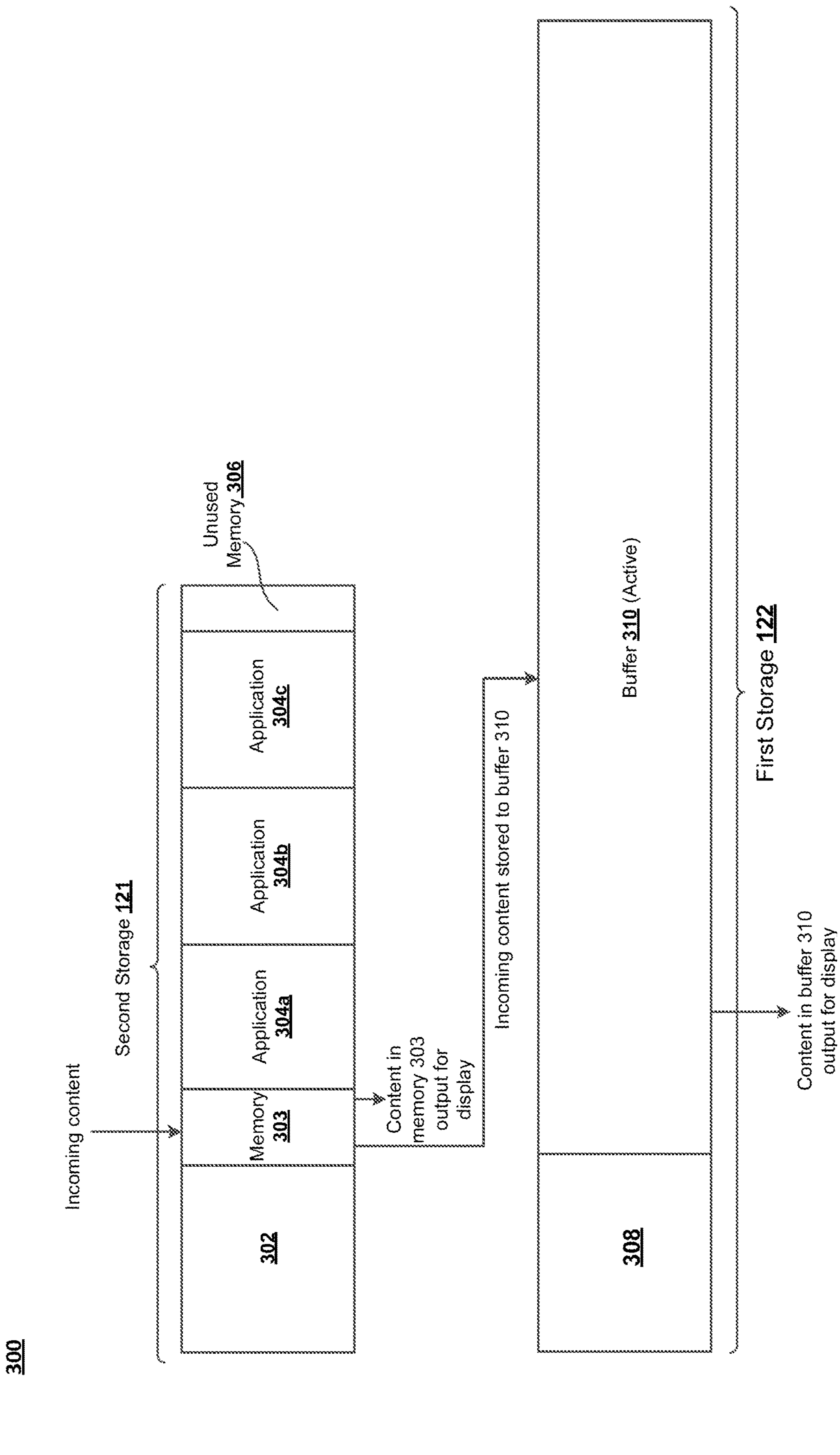
FIG. 3 is an example system and method.

FIG. 3 is an example system 300 and method. The method may be performed by the system 300 to cause storage of a first portion (e.g., a playback duration) of a content item (e.g., live content stream, linear or time-shifted content stream) in a buffer 310. The buffer 310 may comprise a time-shift-buffer (TSB). The first portion of the content item stored in the buffer 310 may be output for display in response to a user initiating at least one trick-play operation (e.g., a rewinding and/or a pausing operation).

The system 300 may comprise the second storage 121 and the first storage 122. The second storage 121 may store a copy 302 of the operating system (OS). Further, one or more applications 304*a-d* may be loaded onto the second storage 121. The second storage 121 may receive incoming content. The content may be received from the network 111 or another source. The second storage 121 may facilitate local storage of at least a portion (e.g., two seconds) of the incoming content, for processing, e.g., rendering, of the content, in a memory 303. For example, incoming content may be temporarily buffered in the memory 303 to account for network condition variations and to avoid video quality issues, such as freezes. Rendering content may comprise providing audio and/or video, displaying images, facilitating an audio or visual feedback, tactile feedback, and the like. The incoming content that is stored (e.g., temporarily buffered) in the memory 303 may be output for display. At least a portion of the memory in the second storage 121 may be unused (e.g., available) memory 306.

The incoming content that is stored (e.g., temporarily buffered) in the memory 303 may additionally be sent to the first storage 122. The first storage 122 may be used to provide memory to buffer live or time shifted content, such as the buffer 310, for caching a first portion (e.g., a playback duration) of the incoming content (e.g., live content stream, linear or time-shifted content stream). The buffer 310 may comprise a time-shift-buffer (TSB). The first portion of the content item may be stored in the buffer 310 if the output device 116 is activated (e.g., turned on, powered on) and/or if a user associated with the output device 116 switches to a new channel. The first portion of the content item stored in the buffer 310 may comprise any playback duration of the content item, such as 30 minutes, one hour, two hours, four hours, eight hours, etc. of the content item. The first portion stored in the buffer 310 may be leveraged to provide trick play features during playback. The first storage 122 may further store additional data or content 308. The additional data or content 308 may comprise firmware and/or settings data associated with the output device 116, for example.

However, as described above, the first storage 122 may wear out after a high number of read/write/erase cycles. To reduce the number of read/write/erase cycles (and therefore to reduce the wear on the first storage 122), the output device 116 may stop writing to the buffer 310 in particular instances. For example, writing to the buffer 310 may be stopped if a user associated with the output device 116 has not interacted with the output device 116 for a predetermined duration. For example, the output device 116 may determine a duration of user inactivity associated with the output device 116. The output device 116 may stop (e.g., terminate) writing to the buffer 310 based on the duration of user inactivity satisfying (e.g., exceeding) a threshold. The threshold may comprise any amount of time, including but not limited to 30 minutes, one hour, two hours, four hours, eight hours, etc. If the output device 116 stops writing to the buffer 310, the first portion of the content item may remain cached in the buffer 310. Based on the output device 116 stopping writing to the buffer 310, the output device 116 may begin writing the TSB to the second storage 121.

Figure 4:
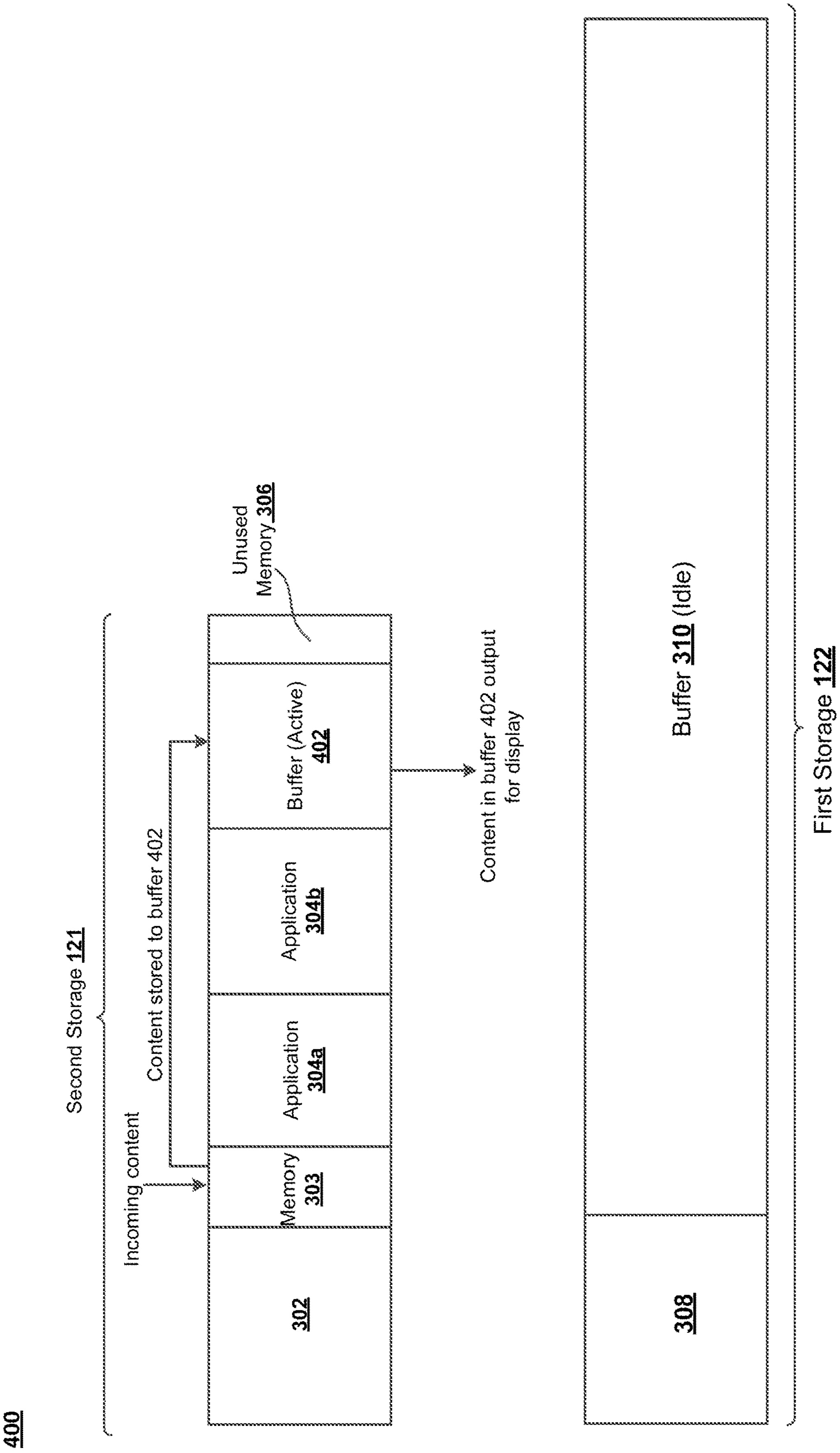
FIG. 4 is an example system and method.

FIG. 4 is an example system 400 for writing content to the second storage 121. The buffer 310 may be idle (e.g., the output device 116 is not writing content to the buffer 310). As described above, the second storage 121 may facilitate local storage of at least a portion (e.g., two seconds or less) of received content for rendering of the content in a memory 303. To write content to the second storage 121, the output device 116 may cause a second portion of the content item to be stored in a buffer 402. The buffer 402 may comprise a time-shift-buffer (TSB). The buffer 402 may be in a different section of the second storage 121 than the memory 303, such that the incoming content is temporarily buffered in the memory 303 to account for network condition variations and to avoid video quality issues, such as freezes, and the second portion of the content in the buffer 402 may be output for display in response to a user initiating at least one trick-play operation.

The output device 116 may determine that the unused memory 306 in the second storage 121 is not a sufficient amount of memory to store the second portion of the content item. If the output device 116 determines that the unused memory 306 in the second storage 121 is not a sufficient amount of memory to store the second portion of the content item, the output device 116 may cause a sufficient amount of memory to become available in the second storage 121. The output device 116, or another controlling device, may cause the sufficient amount of memory to become available in the second storage 121 by unloading at least one application (e.g., the application 304*c*) from the second storage 121. Unloading the at least one application from the second storage 121 may comprise shutting down the at least one application such that it no longer consumes any memory in the second storage 121. The sufficient amount of memory may comprise the unused memory 306 and at least a portion of the memory previously utilized by the application 304*c*. Based on causing the sufficient amount of memory to become available in the second storage 121, the output device 116 may begin writing the second portion of the content to the buffer 402.

The output device 116 may continue writing the second portion of the content to the buffer 402 until the output device 116 is turned off and/or until user activity (e.g., interaction) is detected. If the output device 116 determines a user interaction with the output device 116 while the output device 116 is writing the second portion of the content to the buffer 402, the output device 116 may stop (e.g., terminate) writing the second portion of the content to the buffer 402. Based on stopping writing the second portion of the content to the buffer 402, the output device 116 may re-initiate (e.g., switch back to) writing content to the buffer 310 in the first storage 122. For example, the output device 116 may cause a third portion of the content item to be stored in the buffer 310. The third portion of the content item may be stored in the buffer 310 along with the first portion of the content item. Alternatively, the output device 116 may write over the first portion of the content item in the buffer 310 to store the third portion of the content item in the buffer 310.

Figure 5:
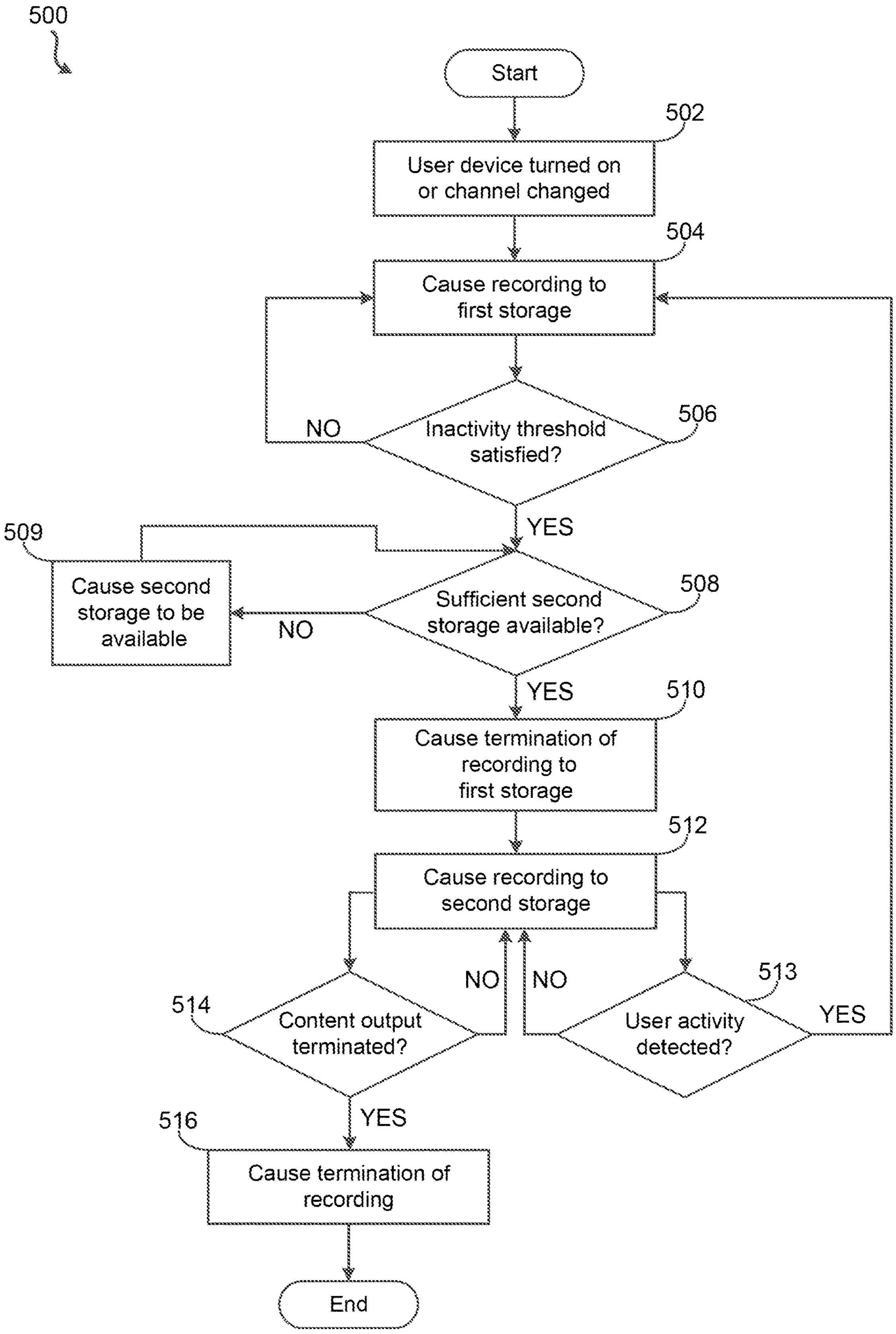
FIG. 5 is an example process.

FIG. 5 is an example process 500 for storing content. The process 500 may be performed, for example, by an output device (e.g., the output device 116). At 502, an output device may be activated. The output device may be activated if it is turned on or powered on. The output device may be activated if a user associated with the output device switches to a new channel. At 504, content may be written to or recorded in a buffer (e.g., TSB) in a first storage. The first storage may be a non-volatile storage medium. The content may be written to or recorded in the buffer in the first storage based on the output device being activated. Writing the content to the buffer in the first storage may comprise causing storage of a first portion of the content item a buffer in the non-volatile storage medium. The first portion of the content item may comprise any playback duration of the content item, such as 30 minutes, one hour, two hours, four hours, eight hours, etc. of the content item. The cached first portion may be leveraged to provide trick play features during playback.

The output device may determine if one or more condition(s) for terminating storage of content to the first storage are satisfied. The condition(s) for terminating storage of content to the first storage may be satisfied if a duration of user inactivity associated with the output device satisfies (e.g., exceeds) a threshold. The threshold may comprise any amount of time, including but not limited to 30 minutes, one hour, two hours, four hours, eight hours, etc.

Determining the duration of the user inactivity associated with the output device may comprise determining an amount of time that has elapsed since a user associated with the output device has interacted with the output device. A user may interact with the output device in a variety of different ways. A user may press/select a button that is included on the output device and/or a button that is included on a remote-control device associated with the output device. A user may send a command, such as a voice command, to the output device and/or to a remote-control device associated with the output device. The voice command may instruct the output device to output certain content, adjust a volume associated with content output, or perform household tasks (e.g., lower your smart blinds, dim smart lights, change the color of your bulbs, etc.) The command may be sent to the output device, for example, via an application installed on a mobile phone or tablet.

The condition(s) for terminating storage of content to the first storage may be satisfied if one or more network conditions are met. The network condition(s) may be met as network conditions improve or deteriorate, if a loss of connectivity to a network is detected, if high packet loss (e.g., due to interference) is detected, and/or if any other network condition is met. The condition(s) for terminating storage of content to the first storage may be satisfied if one or more device conditions are met. The device condition(s) may comprise any condition associated with the output device and/or a remote-control device associated with the output device.

At 506, the output device may determine if the condition(s) for terminating storage of content to the first storage are satisfied. If the condition(s) for terminating storage of content to the first storage are not satisfied, the process may return to operation 504 and continue to write the first portion of the content to buffer in the first storage. Conversely, if the condition(s) for terminating storage of content to the first storage are satisfied, the process 500 may proceed to operation 508.

At 508, it may be determined if a second storage comprises a sufficient amount of memory available to store the second portion of the content item. The second storage medium may comprise a volatile storage medium. If it is determined that the second storage does not comprise a sufficient amount of memory available to store the second portion of the content item, the process 500 may proceed to operation 509. At 509, the output device may cause the sufficient amount of memory to become available in the second storage by unloading at least one application from second storage. The at least one application may comprise one or more applications that are loaded to the second storage but are not currently in use. Based on unloading at least one application from second storage, the process 500 may return to operation 508 to determine if the second storage comprises a sufficient amount of memory available to store the second portion of the content item.

Conversely, if it is determined that the second storage comprises a sufficient amount of memory available to store the second portion of the content item, the process 500 may proceed to step 510. At 510, recording of the content to the buffer in the first storage may be terminated. At 512, the content may be written to or recorded in the second storage. To write the content to the second storage, the output device may cause the second portion of the content item to be stored to the second storage. The second portion of the content item may be stored in a different (e.g., additional) section of the second storage than the incoming content buffer is stored in.

The output device may continue writing content to the second storage until one or more conditions for reinitiating storage of content to the buffer in the first storage is satisfied. The condition(s) for reinitiating storage of content to the buffer in the first storage may be satisfied if the output device is turned off. The condition(s) for reinitiating storage of content to the buffer in the first storage may be satisfied if user activity (e.g., interaction with the output device) is detected. The condition(s) for reinitiating storage of content to the buffer in the first storage may be satisfied if one or more network conditions are met. The network condition(s) may be met as network conditions improve or deteriorate, if a connectivity to a network is detected, and/or if any other network condition is met. The condition(s) for reinitiating storage of content to the buffer in the first storage may be satisfied if one or more device conditions are met. The device condition(s) may comprise any condition associated with the output device and/or a remote-control device associated with the output device.

At 513, it may be determined that the condition(s) for reinitiating storage of content to the buffer in the first storage are satisfied. If the condition(s) for reinitiating storage of content to the buffer in the first storage are satisfied, the process 500 may return to operation 504 and re-initiate writing content to the buffer (e.g., TSB) in the first storage instead of to the second storage. If the condition(s) for reinitiating storage of content to the buffer in the first storage are not satisfied, the process 500 may return to operation 512 and continue writing the content to the second storage. At 514, it may be determined if content output is terminated. Content output may be terminated if the output device is powered off. Content output may be terminated if the output device enters into a standby mode. In standby mode, the output device may utilize less resources but is still powered on. To utilize less resources, the output device may stop receiving and decoding incoming content and/or may turn off output (e.g., HDMI, etc.). In standby mode, the output device may be configured to wake up (e.g., exit standby mode) in response to a key press. The output device may still be configured to run the CPU in standby mode.

If content output is not terminated, the process 500 may return to operation 512 and continue writing content to the second storage. If content output is not terminated, the process 500 may proceed to operation 516. At 516, termination of the recording may be caused. Causing termination of the recording may comprise terminating writing of the content to the second storage without reinitiating writing of the content to the buffer in the first storage.

Figure 6:
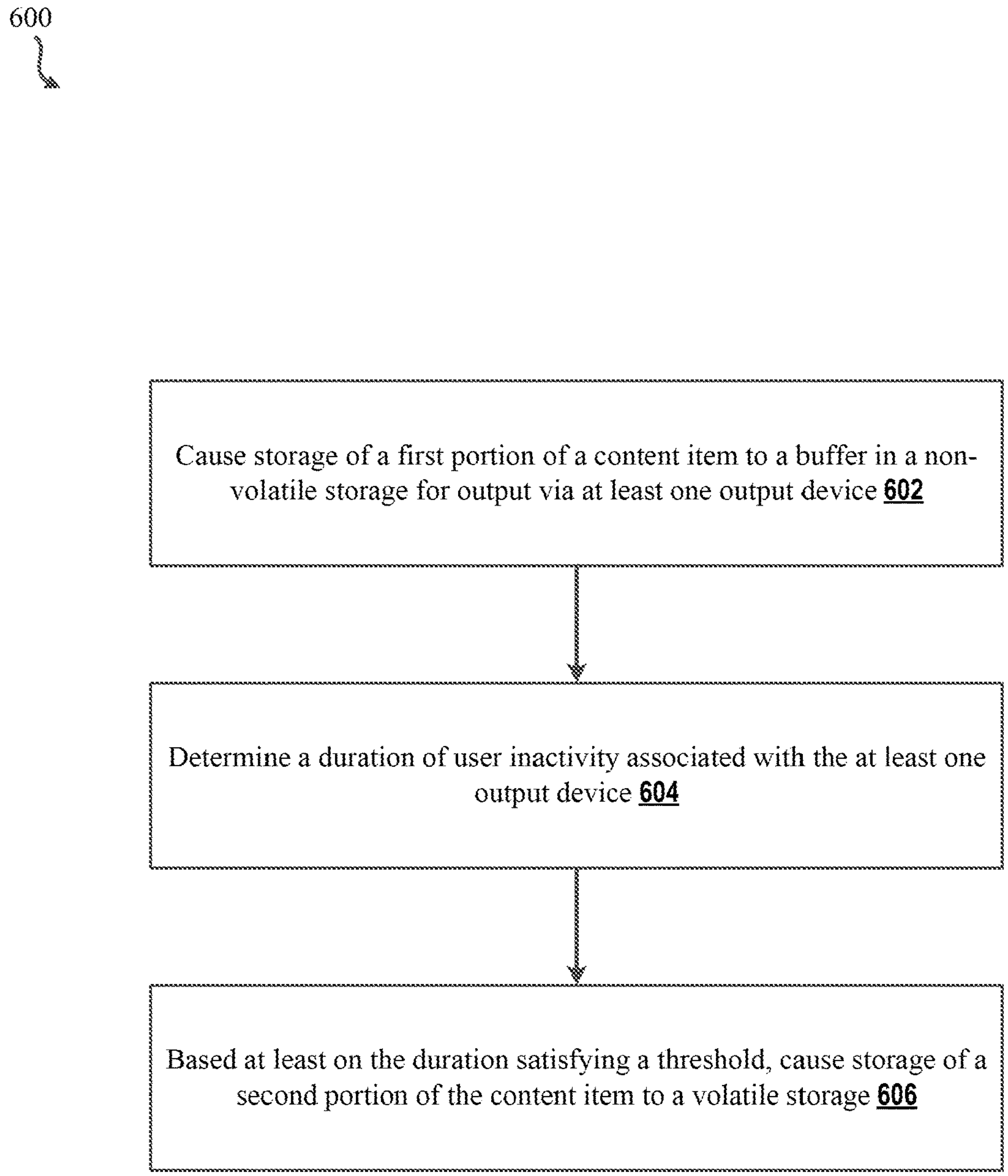
FIG. 6 is example method.

FIG. 6 is an example method 600. The method 600 may comprise a computer implemented method for storing content. A system and/or computing environment, such as the system 100 of FIG. 1 and/or the computing environment of FIG. 9, may be configured to perform the method 600. For example, the output device 116 of FIG. 1 and/or FIG. 2, may be configured to perform the method 600.

At 602, storage of a first portion of a content item to a buffer (e.g., TSB) in a first storage may be caused. The first storage may comprise a non-volatile memory. The non-volatile memory may comprise one or more hard disc drives (HDDs) and/or flash memory (e.g., NAND, eMMC, etc.). The first portion of the content item may be stored to (e.g., cached in) the first storage for output via at least one output device. The first portion of the content item may be cached in the first storage if an output device is activated (e.g., turned on, powered on) and/or if a user associated with the output device switches to a new channel. The first portion of the content item may comprise any playback duration of the content item, such as 30 minutes, one hour, two hours, four hours, eight hours, etc. of the content item. The stored first portion of the content item may be leveraged to provide trick play features during playback.

At 604, a duration of user inactivity associated with the at least one output device may be determined. Determining the duration of the user inactivity associated with the output device(s) may comprise determining an amount of time that has elapsed since a user associated with the output device(s) has interacted with the output device(s). A user may interact with the output device(s) in a variety of different ways. A user may press/select a button that is included on the output device and/or a button that is included on a remote-control device associated with the output device. A user may send a command, such as a voice command, to the output device and/or to a remote-control device associated with the output device. The voice command may instruct the output device to output certain content, adjust a volume associated with content output, or perform household tasks (e.g., lower your smart blinds, dim smart lights, change the color of your bulbs, etc.) The command may be sent to the output device, for example, via an application installed on a mobile phone or tablet. A user may interact with the output device by moving one or more body parts. A user interaction with the output device may comprise a detection of the movement of the body part(s) by the output device. The output device may comprise a motion detection sensor and/or other motion detection hardware configured to detect the movement of the body part(s).

Based on the duration of user inactivity associated with the output device(s) satisfying a threshold, storage of the first portion of the content item to the buffer in the first storage may be terminated. At 606, storage of a second portion of the content item to a second storage may be caused. The second storage may comprise a volatile storage. The volatile storage may comprise a random access memory (RAM) or dynamic RAM (DRAM). The storage of a second portion of the content item to a second storage may be caused based at least on the duration of user inactivity associated with the output device(s) satisfying the threshold. The threshold may comprise any amount of time, including but not limited to 30 minutes, one hour, two hours, four hours, eight hours, etc.

It may be determined if the second storage comprises a sufficient amount of memory available to store the second portion of the content item. If it is determined that the second storage comprises a sufficient amount of memory available to store the second portion of the content item, storage of the second portion of the content item to a second storage may be caused. Conversely, if it is determined that the second storage does not comprise a sufficient amount of memory available to store the second portion of the content item, the sufficient amount of memory may be caused to become available in the second storage. The sufficient amount of memory may be caused to become available in the second storage by unloading at least one application from the second storage. The at least one application may comprise one or more applications that are loaded to the second storage but are not currently in use. Based on causing the sufficient amount of memory to become available in the second storage, storage of the second portion of the content item to the second storage may be caused.

Storage of the second portion of the content item to the second storage may be caused until the output device is turned off and/or until user activity (e.g., interaction) is detected. Execution of at least one trickplay operation may be caused using at least one of the first portion of the content item stored to the first storage and/or the second portion of the content item stored to the second storage. The at least one trickplay operation may comprise a rewinding and/or a pausing operation.

Figure 7:
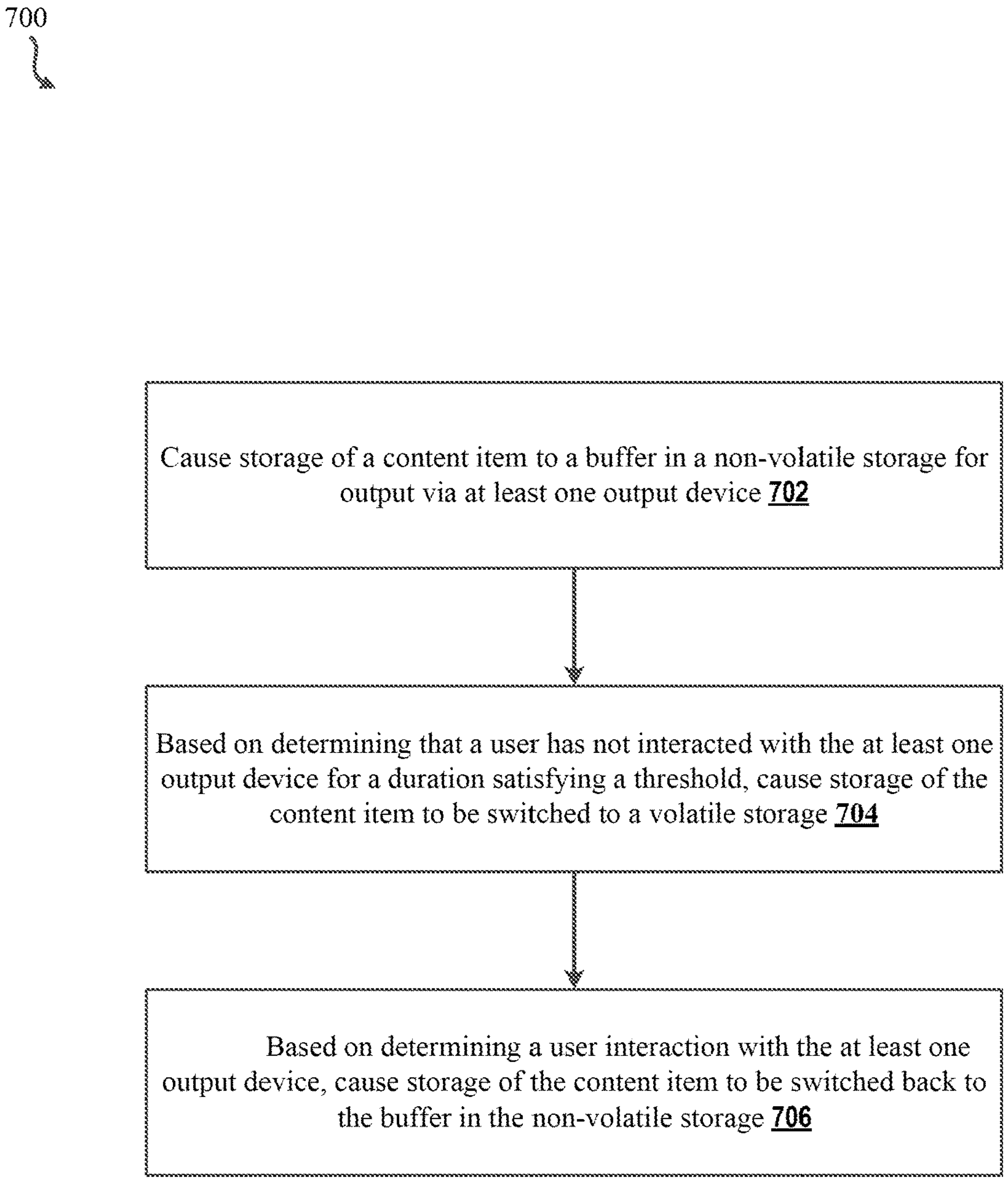
FIG. 7 is an example method.

FIG. 7 is an example method 700. The method 700 may comprise a computer implemented method for storing content. A system and/or computing environment, such as the system 100 of FIG. 1 and/or the computing environment of FIG. 9, may be configured to perform the method 700. For example, the output device 116 of FIG. 1 and/or FIG. 2, may be configured to perform the method 700.

At 702, storage of a first portion of a content item to a buffer (e.g., TSB) in a first storage may be caused. The first storage may comprise a non-volatile memory. The non-volatile memory may comprise one or more hard disc drives (HDDs) and/or flash memory (e.g., NAND, eMMC, etc.). The first portion of the content item may be stored to (e.g., cached in) the first storage for output via at least one output device. The first portion of the content item may be cached in the first storage if an output device is activated (e.g., turned on, powered on) and/or if a user associated with the output device switches to a new channel. The first portion of the content item may comprise any playback duration of the content item, such as 30 minutes, one hour, two hours, four hours, eight hours, etc. of the content item. The stored first portion of the content item may be leveraged to provide trick play features during playback.

A duration of user inactivity associated with the at least one output device may be determined. Determining the duration of the user inactivity associated with the output device(s) may comprise determining an amount of time that has elapsed since a user associated with the output device(s) has interacted with the output device(s). A user may interact with an output device in a variety of different ways. A user may press/select a button that is included on the output device and/or a button that is included on a remote-control device associated with the output device. A user may send a command, such as a voice command, to the output device and/or to a remote-control device associated with the output device. The voice command may instruct the output device to output certain content, adjust a volume associated with content output, or perform household tasks (e.g., lower your smart blinds, dim smart lights, change the color of your bulbs, etc.) The command may be sent to the output device, for example, via an application installed on a mobile phone or tablet. A user may interact with the output device by moving one or more body parts. A user interaction with the output device may comprise a detection of the movement of the body part(s) by the output device. The output device may comprise a motion detection sensor and/or other motion detection hardware configured to detect the movement of the body part(s).

At 704, storage of the content item may be caused to be switched to a second storage. The second storage may comprise a volatile storage. The volatile storage may comprise a random access memory (RAM) or dynamic RAM (DRAM). The storage of the content item may be caused to be switched to the second storage from the first storage. The storage of the content item may be caused to be switched to a second storage based on determining that a user has not interacted with the at least one output device for a duration satisfying a threshold. Determining that a user has not interacted with the at least one output device for a duration satisfying a threshold may comprise determining that the duration of user inactivity satisfies (e.g., exceeds) the threshold. The threshold may comprise any amount of time, including but not limited to 30 minutes, one hour, two hours, four hours, eight hours, etc. Causing storage of the content item to be switched to the second storage may comprise causing termination of storage of the content item to the first storage.

Storage of the content item to the second storage may be caused until the output device is turned off and/or until user activity (e.g., interaction) is detected. At 706, storage of the content item may be caused to be switched back to the buffer in the first storage. Causing storage of the content item to be switched back to the buffer in the first storage may be based on determining a user interaction with the at least one output device. The user interaction with the at least one output device may be determined while the content item is being caused to be stored in the second storage. Causing storage of the content item to be switched back to the buffer in the first storage may comprise terminating storage of the content item to the second storage.

Figure 8:
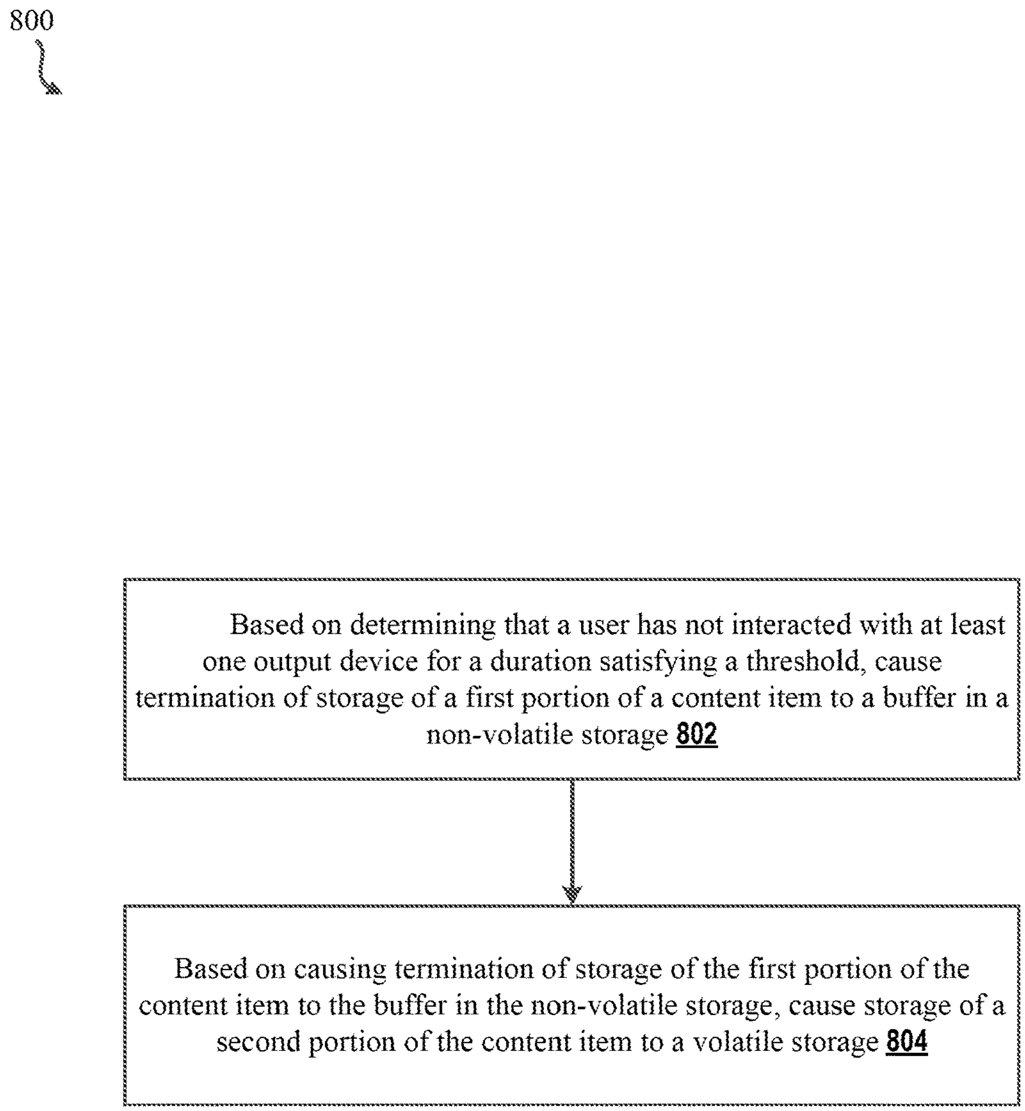
FIG. 8 is an example method.

FIG. 8 is an example method 800. The method 800 may comprise a computer implemented method for storing content. A system and/or computing environment, such as the system 100 of FIG. 1 and/or the computing environment of FIG. 9, may be configured to perform the method 800. For example, the output device 116 of FIG. 1 and/or FIG. 2, may be configured to perform the method 800.

Storage of a first portion of a content item to a buffer in a first storage may be caused. The first storage may comprise a non-volatile memory. The non-volatile memory may comprise one or more hard disc drives (HDDs) and/or flash memory (e.g., NAND, eMMC, etc.). The first portion of the content item may be stored to (e.g., cached in) the first storage for output via at least one output device. A duration of user inactivity associated with the at least one output device may be determined. Determining the duration of the user inactivity associated with the output device(s) may comprise determining an amount of time that has elapsed since a user associated with the output device(s) has interacted with the output device(s). A user may interact with an output device in a variety of different ways. A user may press/select a button that is included on the output device and/or a button that is included on a remote-control device associated with the output device. A user may send a command, such as a voice command, to the output device and/or to a remote-control device associated with the output device. The voice command may instruct the output device to output certain content, adjust a volume associated with content output, or perform household tasks (e.g., lower your smart blinds, dim smart lights, change the color of your bulbs, etc.) The command may be sent to the output device, for example, via an application installed on a mobile phone or tablet. A user may interact with the output device by moving one or more body parts. A user interaction with the output device may comprise a detection of the movement of the body part(s) by the output device. The output device may comprise a motion detection sensor and/or other motion detection hardware configured to detect the movement of the body part(s).

At 802, termination of storage of the first portion of the content item to the buffer in the first storage may be caused. Termination of storage of the first portion of the content item to the buffer in the first storage may be caused based on determining that a user has not interacted with the at least one output device for a duration satisfying a threshold. Determining that a user has not interacted with the at least one output device for a duration satisfying a threshold may comprise determining that the duration of user inactivity associated with the at least one output device satisfies (e.g., exceeds) a threshold. The threshold may comprise any amount of time, including but not limited to 30 minutes, one hour, two hours, four hours, eight hours, etc.

At 804, storage of a second portion of the content item to a second storage may be caused. The second storage may comprise a volatile storage. The volatile storage may comprise a random access memory (RAM) or dynamic RAM (DRAM). Storage of the second portion of the content item to the second storage may be caused based on causing termination of storage of the first portion of the content item to the first storage. Storage of the second portion of the content item to the second storage may be caused until the output device is turned off and/or until user activity (e.g., interaction) is detected. Execution of at least one trickplay operation may be caused using at least one of the first portion of the content item stored to the first storage and/or the second portion of the content item stored to the second storage. The at least one trickplay operation may comprise a rewinding and/or a pausing operation.

Figure 9:
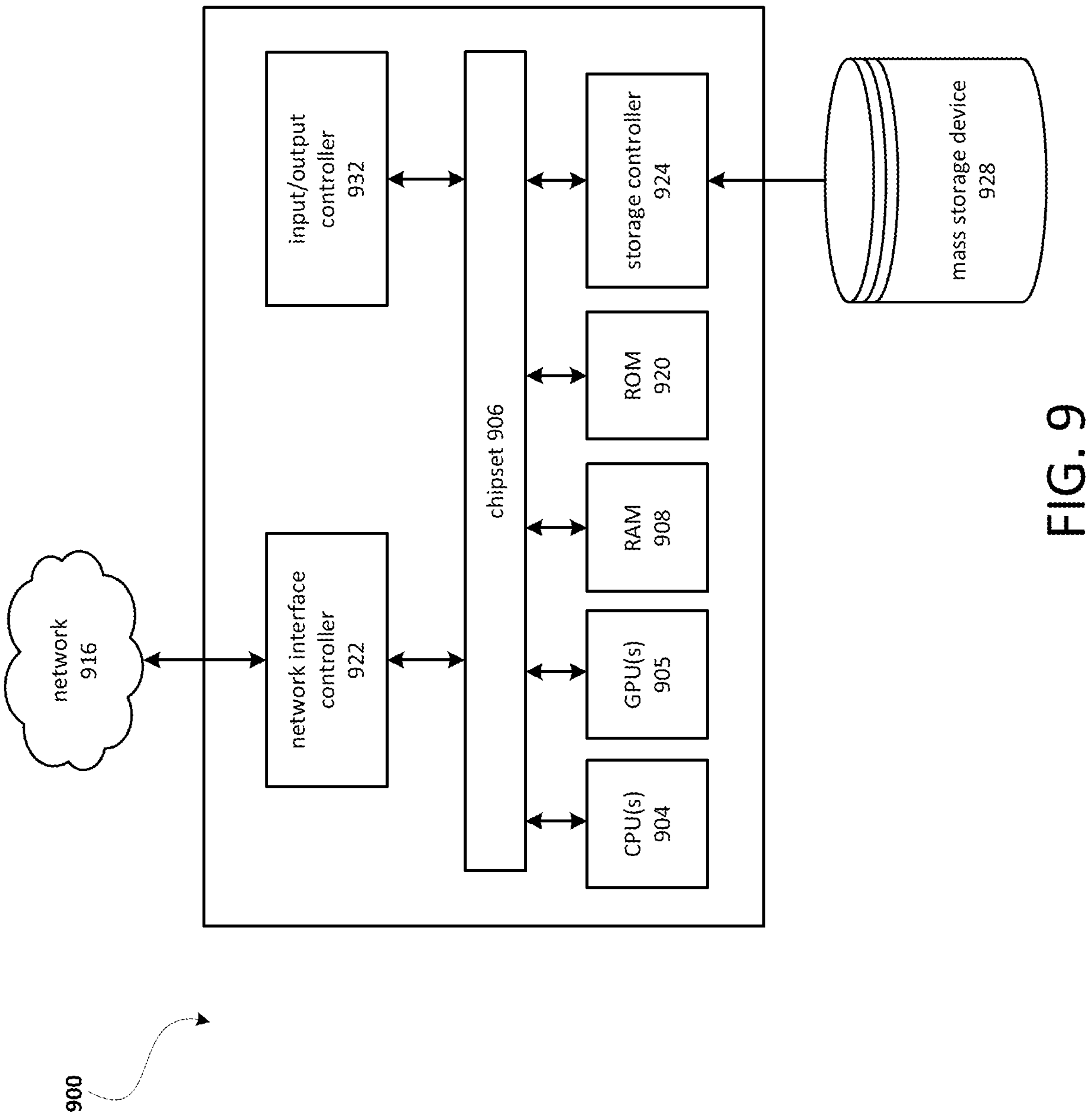
FIG. 9 is an example computing device.

FIG. 9 is example computing device 900 that may represent any of the various devices or entities shown in FIG. 1 or FIG. 2, including, for example, central location 110, QAM 112, the encoder 114, the network 111, the output device 116, and/or the display 120. That is, the computing device 900 shown in FIG. 9 may be any smartphone, server computer, workstation, access point, router, gateway, tablet computer, laptop computer, notebook computer, desktop computer, personal computer, television, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or FIG. 2 or any of the methods described in relation to FIGS. 6-8.

The computing device 900 may include a baseboard, or "motherboard," which is a printed circuit board to which a multitude of components or devices may be connected by way of a system bus or other electrical communication paths. One or more central processing units (CPUs or "processors") 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random-access memory (RAM) 908 (e.g., second storage 121) used as the main memory in the computing device 900. The chipset 906 may provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems of the system 100. The chipset 906 may include functionality for providing network connectivity through a network interface controller (NIC) 922. A NIC 922 may be capable of connecting the computing device 900 to other computing nodes over the system 100.

It should be appreciated that multiple NICs 922 may be present in the computing device 900, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the system 100. For example, the NIC 922 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, one or more Bluetooth protocols, and/or the like.

The computing device 900 may be connected to a mass storage device 928 (e.g., first storage 122) that provides non-volatile storage (i.e., memory) for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the mass storage device 928 by detecting the physical states or characteristics of one or more particular locations within the physical storage units.

In addition to the mass storage device 928 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described herein. The computing device 900 may have access to computer-readable storage media storing computer-executable instructions, which, when executed by the computing device 900, may perform the methods described in relation to FIGS. 6-8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a." "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey data indicating a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow: plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:

causing storage of a first portion of a content item to a buffer in a non-volatile storage of at least one output device for output via the at least one output device;

determining a duration of user inactivity associated with the at least one output device; and based at least on the duration satisfying a threshold, causing storage of a second portion of the content item to a volatile storage of the at least one output device.

2. The method of claim 1, further comprising:

causing execution of a trickplay operation using at least one of the first portion of the content item stored to the buffer in the non-volatile storage or the second portion of the content item stored to the volatile storage.

3. The method of claim 1, wherein determining the duration of the user inactivity associated with the at least one output device comprises determining an amount of time that has elapsed since a user associated with the at least one output device has interacted with the at least one output device.

4. The method of claim 1, further comprising:

based on determining that the volatile storage does not comprise a sufficient amount of memory available to store the second portion of the content item, causing the sufficient amount of memory in the volatile storage to become available by unloading at least one inactive application from the volatile storage.

5. The method of claim 1, further comprising:

based on determining a user interaction with the at least one output device, terminating storage of the second portion of the content item to the volatile storage; and causing storage of a third portion of the content item to the buffer in the non-volatile storage.

6. The method of claim 1, wherein the buffer in the non-volatile storage comprises a time-shift buffer (TSB).

7. The method of claim 1, wherein the non-volatile storage comprises a flash memory and the volatile storage comprises a random-access memory (RAM).

8. The method of claim 1, wherein the output device comprises one or more of a set-top box, a television, a display device, a computer, a smartphone, a laptop, a tablet, a multimedia playback device, or a portable electronic device.

9. A method comprising:

causing storage of a content item to a buffer in a non-volatile storage of at least one output device for output via the at least one output device;

based on determining that a user has not interacted with the at least one output device for a duration satisfying a threshold, causing storage of the content item to be switched to a volatile storage of the at least one output device; and based on determining a user interaction with the at least one output device, causing storage of the content item to be switched back to the buffer in the non-volatile storage of the at least one output device.

10. The method of claim 9, further comprising:

causing execution of a trickplay operation using at least one of a portion of the content item stored to the buffer in the non-volatile storage or a portion of the content item stored to the volatile storage.

11. The method of claim 9, wherein determining that the user has not interacted with the at least one output device for the duration satisfying the threshold comprises determining that the at least one output device has not received data indicating a button selection or data indicating a voice command from the user for the duration.

12. The method of claim 9, further comprising:

based on determining that the volatile storage does not comprise a sufficient amount of memory available to store a portion of the content item, causing the sufficient amount of memory in the volatile storage to become available by unloading at least one inactive application from the volatile storage.

13. The method of claim 9, wherein determining the user interaction with the at least one output device comprises at least one of receiving, via the at least one output device, data indicating a button selection from the user or receiving, at the at least one output device, data indicating a voice command from the user.

14. The method of claim 9, wherein the buffer in the non-volatile storage comprises a flash memory and the volatile storage comprises a random-access memory (RAM).

15. A method comprising:

based on determining that a user has not interacted with at least one output device for a duration satisfying a threshold, causing termination of storage of a first portion of a content item to a buffer in a non-volatile storage of the at least one output device; and based on causing termination of storage of the first portion of the content item to the non-volatile storage of the at least one output device, causing storage of a second portion of the content item to a volatile storage of the at least one output device.

16. The method of claim 15, further comprising:

causing execution of a trickplay operation using at least one of a portion of the content item stored to the buffer in the non-volatile storage or a portion of the content item stored to the volatile storage.

17. The method of claim 15, wherein determining that the user has not interacted with the at least one output device for the duration satisfying the threshold comprises determining that the at least one output device has not received data indicating a button selection or data indicating a voice command from the user for the duration.

18. The method of claim 15, further comprising:

based on determining that the volatile storage does not comprise a sufficient amount of memory available to store the second portion of the content item, causing the sufficient amount of memory in the volatile storage to become available by unloading at least one inactive application from the volatile storage.

19. The method of claim 15, further comprising:

based on determining a user interaction with the at least one output device, terminating storage of the second portion of the content item to the volatile storage; and causing storage of a third portion of the content item to the buffer in the non-volatile storage for output via the at least one output device.

20. The method of claim 15, wherein the non-volatile storage comprises a flash memory and the volatile storage comprises a random-access memory (RAM).

* * * * *